United States Patent Office 2,819,977
Patented Jan. 14, 1958

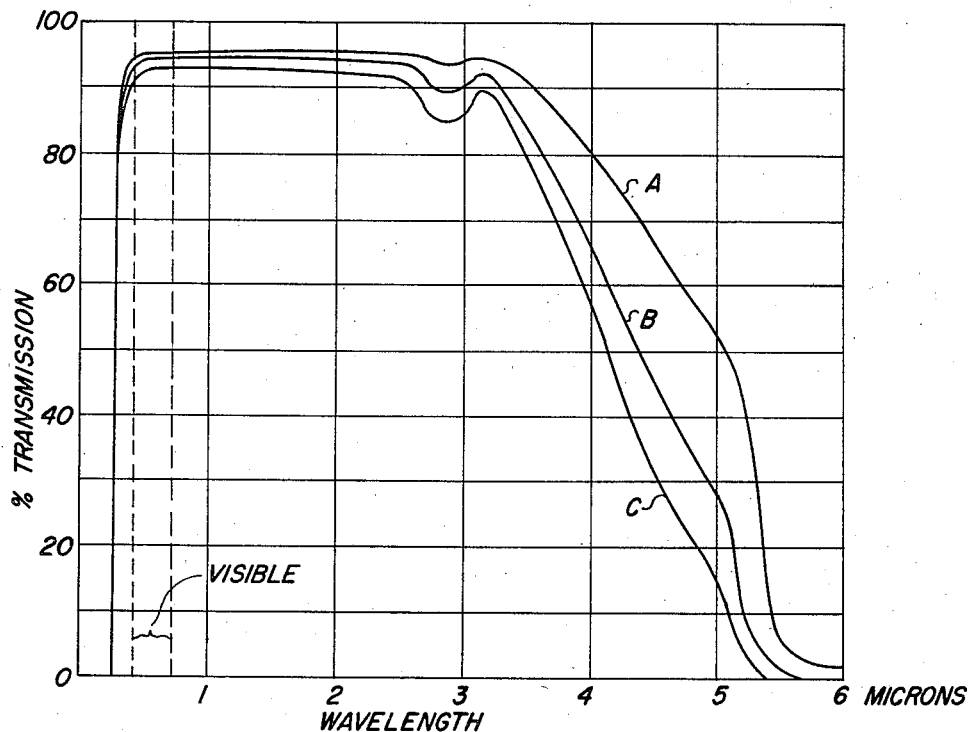

2,819,977
INFRARED TRANSMITTING FLUORIDE GLASS

Paul F. De Paolis, Rochester, N. Y., assignor to Eastman Kodak Company, Rochester, N. Y., a corporation of New Jersey Application July 1, 1955, Serial No. 519,539

2 Claims. (Cl. 106—47)

This invention relates to fluoride glass, particularly to an improved form of the glass described in U. S. 2,511,-224, K. H. Sun and M. L. Huggins.

It is the object of the present invention to provide a glass which has all of the optical properties of fluoride glasses such as extremely high V value representing low dispersion and which in addition has an exceptionally long partial dispersion for blue light. The dispersion index $$V = \frac{N_D - 1}{N_F - N_C}$$

It is a particular object of the invention to provide such a glass which is highly transmitting far into the infrared region. Glass according to the present invention is so satisfactory in this respect that it is used not only for optical elements such as lenses, but also as simple infrared-transmitting windows.

According to the present invention the above results are obtained in a glass containing substantial amounts of aluminum fluoride and beryllium fluoride along with some magnesium fluoride and lanthanum fluoride by the addition of both a very large amount of strontium fluoride and some lead fluoride. The essential feature is the combination of lead fluoride with a very high percentage of strontium fluoride. Small amounts of other fluorides such as calcium, barium, lithium, sodium and potassium may be added since these particular fluorides do not appreciably affect the operation of the present invention and more complex glasses are always less susceptible to devitrification or crystallization. However, perfectly satisfactory glasses have been made without these additional fluorides. On the other hand, it is important to eliminate from the glass any thorium fluoride or cerium fluoride if the above objects are to be accomplished.

Temperatures and conditions for production of glass according to the invention are as described in the above-mentioned Sun and Huggins patent (see column 11, lines 53 to 68).

The following table shows two examples of glass batches made according to the preferred embodiment of the present invention:

|  | Example 1 | | Example 2 | |
| --- | --- | --- | --- | --- |
|  | Weight Percent | Mol Percent | Weight Percent | Mol Percent |
| $MgF_2$ | 9.0 | 11.9 | 9.5 | 12.0 |
| $SrF_2$ | 34.9 | 23.0 | 36.9 | 23.0 |
| $PbF_2$ | 5.9 | 2.0 | 3.1 | 1.0 |
| $AlF_3$ | 20.3 | 20.0 | 19.3 | 18.0 |
| $BeF_2$ | 22.8 | 40.1 | 24.0 | 40.0 |
| $LaF_3$ | 7.1 | 3.0 | 2.5 | 1.0 |
| $CaF_2$ |  |  | 1.0 | 1.0 |
| $BaF_2$ |  |  | 2.2 | 1.0 |
| $LiF$ |  |  | .3 | 1.0 |
| $NaF$ |  |  | .5 | 1.0 |
| $KF$ |  |  | .7 | 1.0 |
| $N_D$ | 1.384 | | 1.381 | |
| $V$ | 95.5 | | 99.6 | |

It will be noted that the index of refraction and V value of the glass is in the same general area as the fluoride glasses described in the Sun et al. Patent 2,511,224 mentioned above. The VgF for Example 1 is .526, which also conforms to the value for the glasses described in the patent just referred to.

By definition $$VgF = \frac{N_g - N_F}{N_F - N_C}$$

The values of the six main components given in each of Examples 1 and 2 are rather critical although there is some tolerance in these values which still give a useable glass. The magnesium, aluminum and beryllium can be varied over the same range as in the Sun et al. patent. Magnesium fluoride can vary from 6 to 13% by weight, aluminum fluoride from 15 to 25% and beryllium fluoride from 12 to 25%.

A preferred embodiment of the invention is a glass resulting from fusion of a batch consisting essentially of approximately the following percentages by weight: magnesium fluoride 9, aluminum fluoride 20, beryllium fluoride 23, lanthanum fluoride 7, lead fluoride 6 and strontium fluoride 35.

The lanthanum fluoride preferably covers a range with a somewhat higher upper limit than that associated with the flucride glasses described in the Sun et al. patent, but the lower limit is about the same. In the present case the lanthanum fluoride can vary from 2.5 to 10% by weight. The essential features of the present invention are concerned with the lead and strontium fluoride contents. The lead fluoride can vary from 2 to 10% and the strontium fluoride should be quite high and can vary from 30 to 50% by weight. These ranges all refer to the percentage by weight of the fluorides in the batch prior to fusion, which is the normal and most useful manner of describing a glass composition.

The above table gives both the weight percentages and the mol percentages of the fluorides in the batch. Examples 1 and 2 have approximately the same index of refraction and Example 2 has a somewhat higher V value.

The accompanying drawing shows the percentage transmission of the glass (Example 1) over a spectral range from .25 to 6 microns wavelength.

Curve A shows the transmission measured on a spectrophotometer for a sample of Example 1 glass 2.0 mm. thick. Curve B is for a sample 4.0 mm. and curve C is for a sample 6.0 mm. thick. This glass is clear throughout the visible spectrum and transmits highly in the infrared well beyond 5.0 microns, even out to 5.5 microns.

I claim:

1. A glass resulting from fusion of a batch free of thorium and cerium, and consisting of fluorides including the following fluorides in the percentages by weight given: magnesium 6 to 13 percent, aluminum 15 to 25 percent, beryllium 12 to 25 percent, lanthanum 2.5 to 10 percent, lead 2 to 10 percent and strontium 30 to 50 percent.

2. A glass resulting from fusion of a batch consisting essentially of approximately the following percentages by weight: magnesium fluoride 9, aluminum fluoride 20, beryllium fluoride 23, lanthanum fluoride 7, lead fluoride 6 and strontium fluoride 35.

References Cited in the file of this patent

UNITED STATES PATENTS

| 2,466,509 | Sun et al. | Apr. 5, 1949 |
| 2,511,224 | Sun et al. | June 13, 1950 |